(12) United States Patent
Chicurel Y Uziel et al.

(10) Patent No.: US 9,234,570 B2
(45) Date of Patent: Jan. 12, 2016

(54) SPEED REDUCER

(71) Applicant: Universidad Nacional Autonoma De Mexico, Coyoacan, Mexico City (MX)

(72) Inventors: Enrique Jaime Chicurel Y Uziel, Mexico City (MX); Filiberto Gutierrez Martinez, Mexico City (MX)

(73) Assignee: Universidad Nacional Autonoma de Mexico, Delegacion Coyoacan (MX)

( * ) Notice: Subject to any disclaimer, the term of this patent is extended or adjusted under 35 U.S.C. 154(b) by 93 days.

(21) Appl. No.: 14/162,326

(22) Filed: Jan. 23, 2014

(65) Prior Publication Data

US 2014/0238162 A1    Aug. 28, 2014

(30) Foreign Application Priority Data

Feb. 28, 2013 (MX) .................... MX/a/2013/002354

(51) Int. Cl.
*F16H 1/16* (2006.01)
*F16H 1/20* (2006.01)
*F16H 7/06* (2006.01)
*F16H 25/24* (2006.01)
*F16H 25/22* (2006.01)

(52) U.S. Cl.
CPC .............. *F16H 7/06* (2013.01); *F16H 25/2409* (2013.01); *F16H 25/2228* (2013.01); *F16H 25/2252* (2013.01); *Y10T 74/18152* (2015.01)

(58) Field of Classification Search
CPC ....... F16H 25/2252; F16H 1/163; F16H 7/06; F16H 1/166; F16H 25/2228; F16H 25/2409
See application file for complete search history.

(56) References Cited

U.S. PATENT DOCUMENTS

| | | | |
|---|---|---|---|
| 418,328 A | 12/1889 | Willett | |
| 594,511 A | 11/1897 | Auble | |
| 595,508 A | 12/1897 | Wolander | |
| 626,515 A | 6/1899 | Whitney | |
| 642,430 A | 1/1900 | Corcoran | |
| 747,463 A | 12/1903 | Moore | |
| 1,416,163 A * | 5/1922 | Bock | 74/425 |
| 2,683,379 A | 7/1954 | Strandgren | |
| 3,365,974 A * | 1/1968 | Lieberman | 74/425 |
| 3,406,584 A * | 10/1968 | Roantree | 74/424.92 |
| 3,581,592 A * | 6/1971 | Roehrs et al. | 74/424.6 |
| 4,023,433 A | 5/1977 | Schutz | |
| 5,899,114 A * | 5/1999 | Dolata et al. | 74/424.85 |
| 7,051,610 B2 | 5/2006 | Stoianovici et al. | |

(Continued)

FOREIGN PATENT DOCUMENTS

JP    2000097293 A    4/2000

*Primary Examiner* — William Kelleher
*Assistant Examiner* — Jake Cook
(74) *Attorney, Agent, or Firm* — Fraser Clemens Martin & Miller LLC; James D. Miller

(57) ABSTRACT

This invention refers to a speed reducer made up of a chain carrying nuts and of a screw, i.e., a ball screw in the first embodiment, a roller screw in the second embodiment. The ball screw or the roller screw drives the nuts on one of the straight stretches of the chain. The ball screw, or the roller screw, can be almost as long as the distance between the centers of the output sprockets on which the chain is mounted. Given these features and because the nuts wrap the ball screw, or the roller screw in a great surface, the load capacity is high. Given that in both embodiments there is rolling contact, friction is low and, as a consequence, efficiency is high, and this allows the present invention to serve also as an amplifier.

17 Claims, 16 Drawing Sheets

(56) References Cited

U.S. PATENT DOCUMENTS

| | | |
|---|---|---|
| 7,222,682 B2 | 5/2007 | Doering et al. |
| 8,082,818 B2 | 12/2011 | Sugitani |
| 2010/0170077 A1* | 7/2010 | Kinoshita et al. ............... 29/466 |

* cited by examiner

स्PEED REDUCER

CROSS-REFERENCE TO RELATED APPLICATIONS

This application is a secondary application of Mexican Patent Application Serial No. MX/a/2013/002354 filed Feb. 28, 2013, hereby incorporated herein by reference in its entirety.

FIELD OF THE INVENTION

The present invention refers generally to mechanical transmissions, and more specifically to speed reducers and amplifiers.

BACKGROUND OF THE INVENTION

The worm and gear speed reducer is one of the most frequently used when a large speed reduction is required. However, it has limitations: low load capacity and not a high efficiency. The low load capacity is inherent to the geometry since the pitch cylinder of the worm has only one point of tangency with the pitch cylinder of the gear and, therefore, with very few teeth in contact. The efficiency is not sufficiently high due to the sliding contact between the worm and the gear with the resulting loss of energy due to friction. The sliding contact also gives rise to rubbing that gives rise to wear. Furthermore, in some applications, the heat generated by friction is such that a cooling system is required and this involves a greater complication and higher manufacturing and maintenance costs.

During the preceding centuries several patents were granted referring to concepts to increase the load capacity of the worm and gear reducers by increasing the contact surfaces. The best known concepts to achieve this goal have been, on the one hand, a gear configuration with the circumferential toothed surface concave shaped so as to partially envelop or wrap the worm, and on the other hand, a worm with a concave silhouette which partially envelops the gear. Also, gear and worm assemblies are used with double enveloping arrangements, that is, which simultaneously incorporate both configurations. All of these schemes have contributed to noticeably raise the load capacity, but are still limited.

In 1897, the concept of a screw and chain speed reducer described in U.S. Pat. No. 595,508 by Wolander appeared, which refers to a speed reducer similar to a worm and gear, such as is shown in FIG. 1, but, instead of the gear, it has a transmission chain with threaded links with a small arc of contact with the screw thread. The turning of the screw drives the threaded links, and thus it also drives the chain which is mounted on two identical sprockets. Since the screw is in contact with said threaded links on the straight portion of the chain, the contact surface may be large, and therefore, the load capacity can be higher than that of the configurations described in the previous paragraph. However, since the motion transmission in all of these arrangements is carried out by means of sliding contact, the efficiency is low. The same can be said of patent DE 2406360, published in August 1975, by Werther, as well as patent JP2000-097293 by Hanaguchi Yuuji, published in April 2000, such as is shown in FIG. 2.

U.S. Pat. No. 418,328, published in December 1889 by Willett refers to a mechanism which drives a boat by means of pedals which includes an angular speed amplifier, made up of a chain equipped with small wheels that drive a "spiral B'", such as is shown in FIG. 3. In this case, the efficiency is raised by means of the small wheels and there is the potential to somewhat raise the load capacity but it is not really used, and neither is such possibility mentioned. The same is true for U.S. Pat. No. 594,511 published in November 1897, by Auble whose invention refers to a land vehicle.

U.S. Pat. No. 642,430 published in January 1900 by Corcoran, and DE 3305551 C2 published in September 1990 by Reguzzi, such as are shown in FIG. 4, as well as U.S. Pat. No. 7,222,682 published in May 2007 by Doering, such as is shown in FIG. 5, also refer to chains with small wheels, by which efficiency is raised, but there is also an increased load capacity compared to the patents described in the previous paragraph, because unlike them, all the rods in the chain have small wheels.

On the other hand, the patents: U.S. Pat. No. 626,515 published in June 1899, by Whitney and U.S. Pat. No. 747,463 published in December 1903, by Moore, such as are shown in FIG. 6, refer to worm and gear reducers which include small wheels in the gear to reduce friction and increase efficiency but, as has already been mentioned, this type of reducers have few teeth in contact with the consequent limitation on the load capacity.

In the past few decades there has been a general, great interest, in energy savings. Particularly, in the case of worm and gear speed reducers, patents have been granted, and applications continue to be filed which involve concepts to render them more efficient. Therefore, there are patents, for example, U.S. Pat. No. 4,023,433 published on May 9, 1977, by Schutz, such as can be seen in FIG. 7a; and U.S. Pat. No. 7,051,610 published on May 2006, by Stoianovici, such as can be seen in FIG. 7b, which refer to an assembly of balls that roll between the worm thread and the gear teeth, circulating in a closed circuit, that is to say, that once they have journeyed through the entire helicoid thread, they return through an ad hoc conduit to return and re-journey said thread. Of course, the threads are designed in such a way so as to aid in the transit of the balls. In this manner, the sliding contact between the worm and the gear is substituted by a rolling contact which lowers the friction coefficient thereby decreasing the losses and, consequently, increasing the efficiency. In these patents, the gear partially envelops the worm and the worm partially envelops the gear in order to somewhat increase the load capacity, but within the limit imposed by the geometry of the worm and gear assembly, as has been discussed above.

Other patents which could be considered generally relevant in prior art, as far as the roller screw which is applied in the second embodiment of the present invention, are patents U.S. Pat. No. 2,683,379, published in July 1954, by Strandgren, and U.S. Pat. No. 8,082,818, published in December 2011, by Sugitani. However, these patents do not describe a reducer. The conventional roller screw is driven by a tube which has an internal thread, and in the case of the inverted roller screw, said tube is driven by the screw. However, for the sake of simplicity, the inverted roller screw which is used in the second embodiment of the present invention will be simply called "roller screw". This term refers to an assembly, which basically consists of a worm provided with threaded planetary rollers, and placed within an internally threaded tube. The threaded planetary rollers roll between the worm and the threaded tube, and upon turning they displace said tube on a straight line. In the present invention, the internally threaded tube is substituted by a plurality of nuts which are mounted on the links of a chain transmission.

SUMMARY OF THE INVENTION

The present invention refers to a transformation of a worm and gear reducer to significantly increase both the efficiency and the load capacity. The gear is substituted by a chain transmission carrying nuts. In a first embodiment of this invention, the worm is substituted by a ball screw. In a second embodiment, the worm is substituted by a roller screw.

The efficiency is increased because the sliding contact between the worm and the gear is substituted by the rolling contact between the ball screw and the nuts, or between the roller screw and the nuts. The load capacity is increased because the contact of very few teeth in the worm and gear is substituted by the contact of many nuts that envelop a large surface of the ball screw, or of the roller screw. This is possible because said contact takes place on a straight stretch of the chain, which can be as long as desired.

This invention can also function as an amplifier because the low friction of the ball screw as well as of the roller screw, allows it to function as such.

In both embodiments, the nuts envelop most of the cylindrical surface of the ball screw, or that of the roller screw, and thus the contact surface is much greater than in the case of the worm and gear, as well as in all the other prior art patents which have been described.

Just as in the case of the worm and gear, one turn of the ball screw or of the roller screw, produces a very small fraction of a turn in the sprockets of the transmission chain, i.e., there is a great reduction of angular displacement and, thus, a great speed reduction. In both embodiments, an additional reduction may be obtained by using the differential screw principle, in the case of the first embodiment by using a differential ball screw, such as that described in U.S. Pat. No. 5,899,114 published in May 1999 by Dolata, and in the case of the second embodiment by using a differential roller screw, such as that described in patents U.S. Pat. No. 3,406,584 published in October 1968 by Roantree and FR 2951514 B1, published in March 2012 by Baudasse.

In the invention being described in the present document, advantage is taken of the geometry of the configuration to increase the contact surface and thus increase the load capacity, given that the ball screw and the roller screw can be as long as desired.

As has already been pointed out, in reducers which involve a worm, efforts are being made to overcome the limitations regarding load capacity and efficiency, but the concepts which have been proposed imply reducers which overcome effectively one, and not both limitations in the same reducer.

Therefore, an objective of the present invention is to provide a high efficiency speed reducer/amplifier.

Another objective of this invention is to provide a speed reducer/amplifier with a high load capacity.

An additional objective of this invention is to provide a speed reducer/amplifier with an increased reduction or amplification ratio.

Yet another objective of the present invention is to provide a reducer/amplifier which includes all the objectives mentioned previously, simultaneously in a single unit.

BRIEF DESCRIPTION OF THE DRAWINGS

The particular features and advantages of the present invention, as well as other objectives of the invention, will become apparent in the following description and its accompanying figures:

FIG. 12c referring to the first embodiment, shows a variant of the nut which envelops the ball screw in an arc greater than 180° with a gap that barely allows the shaft of the ball screw to pass through.

DETAILED DESCRIPTION OF THE INVENTION

Definition

Nuts: the term "nut", in the case of the present invention, does not have the usual meaning referring to a fastening device and known in prior art, instead it refers to the components through which the rotating motion of the drive screw, a ball screw or a roller screw, is converted into the linear displacement of the chain.

First Embodiment

Figure 12A:
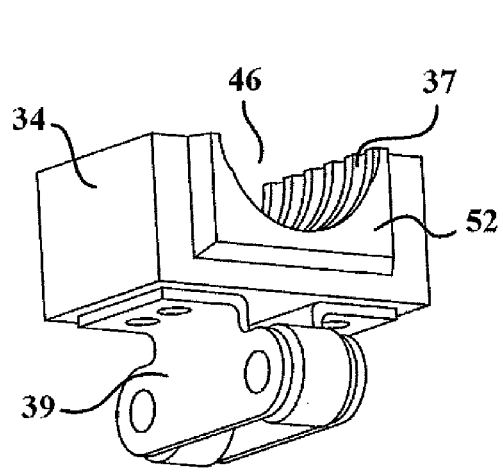
FIG. 12a Referring to the first embodiment, is a conventional perspective view of a chain link, and of the nut fastened unto the same.
Figure 12B:
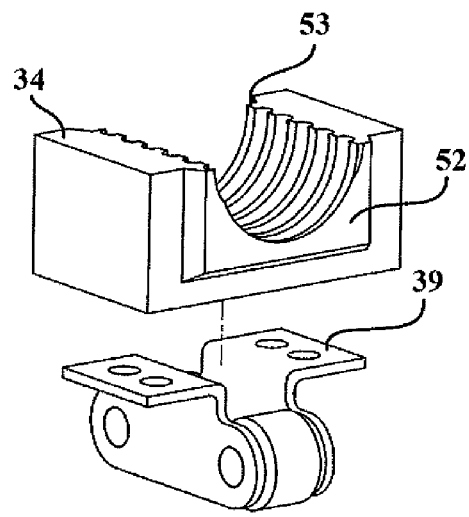
FIG. 12b shows separately a chain link and a nut.
Figure 13:
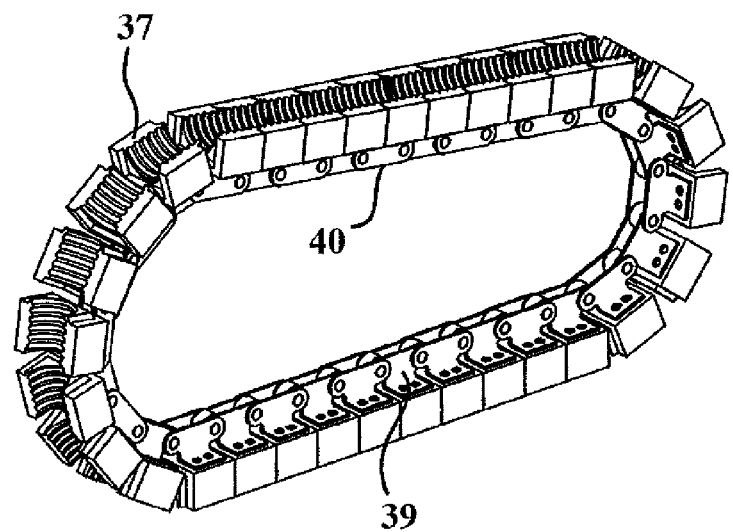
FIG. 13 referring to the first embodiment is a conventional perspective view of the chain with the nuts.
Figure 25:
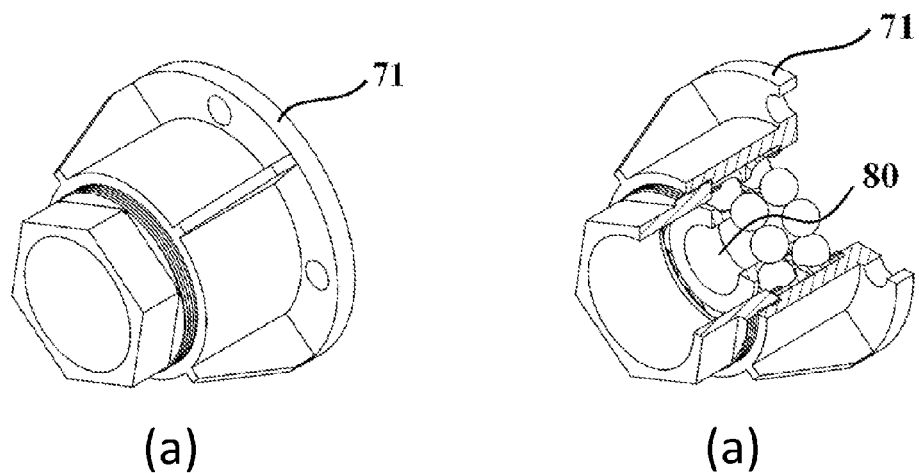
FIG. 25a shows the external view of the flanged support of the bearing of the drive screw.
FIG. 25b shows the flanged support with a portion removed to expose the bearing.

A motor (not shown) is coupled to shaft (31) and makes both it and a ball screw (32) rotate about their common geometric axis, FIGS. 8, 9, 10a, 10b 10c and 24. The reducer input high speed shaft (31) is either keyed, splined or otherwise rotatably fixed to the ball screw (32). The shaft (31) is mounted on one end on a bearing (80) on a flanged support (71). FIG. 25a shows an external view of the flanged support (71), FIG. 25b shows the flanged support (71) with a section removed to show the bearing (80). A nut (34) is fastened to each link (39) of the chain (40) by means of screws, rivets (not shown) or other means known in the art, or the nuts may be integral with the links, FIGS. 12a, 12b and 13.

Figure 10A:
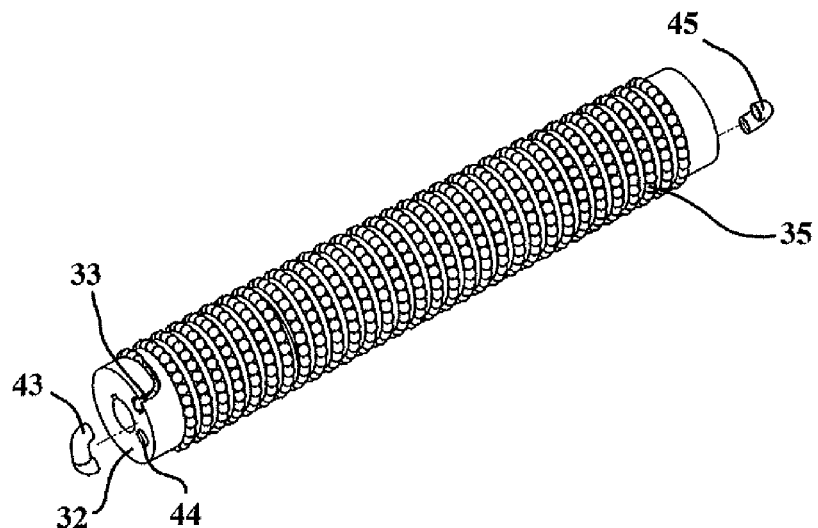
FIG. 10a is a conventional perspective view of the ball screw of the first embodiment, with the re-circulation conduits for the balls, showing the external tubes separated from the screw.
Figures 10B, 10C:
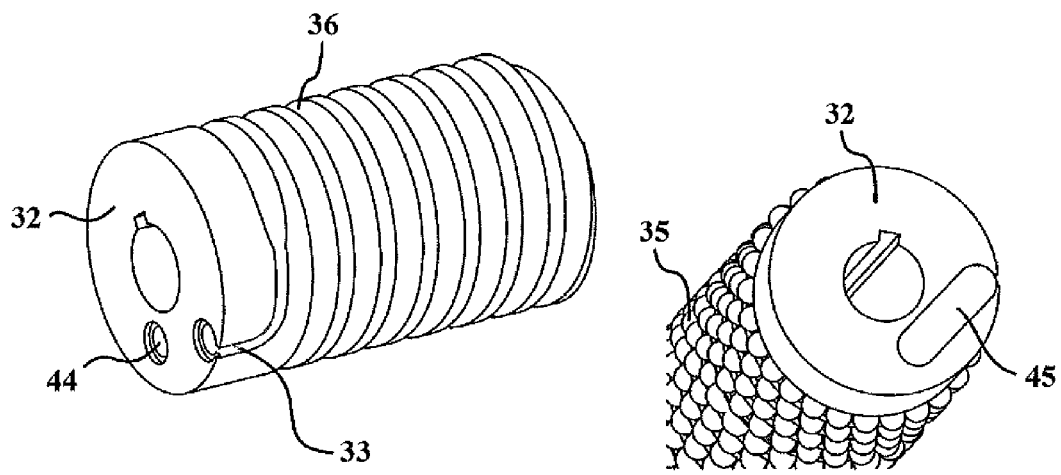
FIG. 10b is a detailed view of one end of the ball screw, without the balls, showing the exit and return conduits for the balls.
FIG. 10c is a conventional perspective of a detailed view of one end of the screw with balls, and with one of the external tubes in operating position.

The ball screw (32) is equipped with recirculating balls (35) which, when rolling describe the helicoid trajectory of thread (36), FIG. 10b and propel the nuts (34) of the chain (40). The balls (35) roll between the helicoid thread (36) of the ball screw (32) and the helicoid thread (37) of the nuts (34), FIGS. 10a, 10b and 12c thus forcing the nuts to be displaced in a straight line. Both threads (36) and (37) have identical helix angles. The thread (36) of the ball screw (32) and the thread (37) of the nuts (34) are helicoid grooves with a cross section which may be in the shape of an arc of a circle, or in "v" shape; both threads (36) and (37) form a helicoid conduit for the rolling of the balls (35).

Figure 12C:
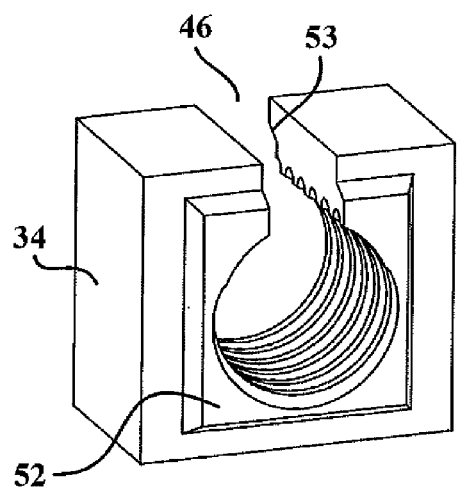
Figure 12D:
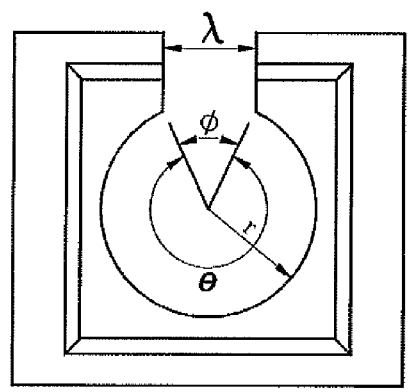
FIG. 12d shows the geometric relations between the gap $\lambda$ of the nut, the angle $\theta$ of the threaded surface of the nut and its conjugate angle $\phi$.

The nuts (34) have a $\lambda$ wide gap (46), FIGS. 12c and 12d, to avoid interference with the shaft (31) of the ball screw (32), as said nuts move along. $\lambda=d+h$, wherein d is the diameter of shaft (31) and h is a clearance, so that said nuts have a threaded surface which subtends an angle $\theta$, where: $\theta=360°-\phi$; $\phi=2$ Arcsin $[\lambda/(2r)]$, where r is the radius of the threaded surface, see FIG. 12d. Thus, the area of the threaded surface of each nut is $r\theta l$, $l=$length of the nut.

FIG. 12c shows a variant of the nuts (34) in which said nuts envelop the ball screw (32) in an arc greater than 180°, since it is only required that the gap (46) of the nuts (34) be sufficiently wide to avoid an interference between the nuts (34) and the shaft (31) of the ball screw (32).

Figure 11A:
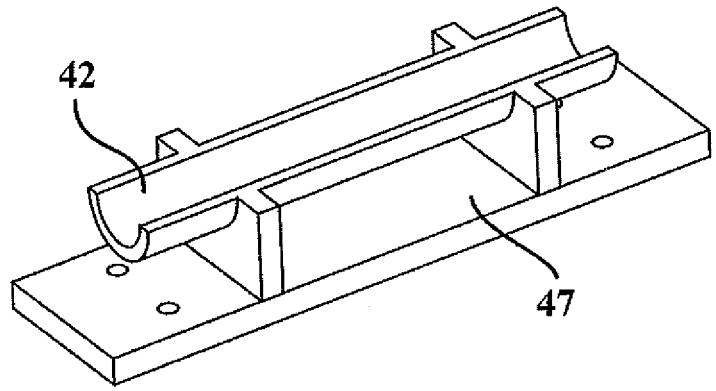
FIG. 11a is a conventional perspective view of the ball retainer trough of the first embodiment. The ball retainer trough which is shown has a semi-circular channel shape to be used with nuts like those in FIGS. 12a and 12b.
Figure 11B:
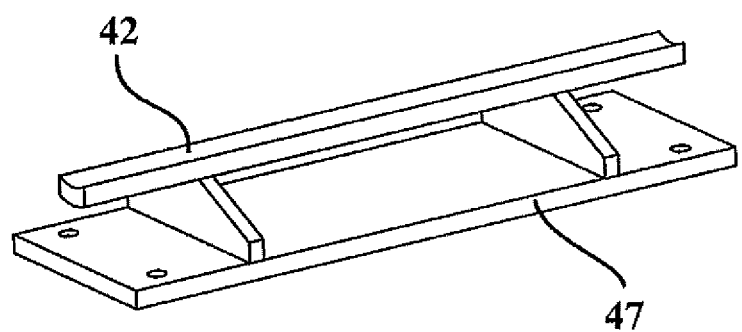
FIG. 11b shows the ball retainer trough to be used with the nuts like those of FIG. 12c.

Because of the gap (46) in the nuts (34), the thread (37) in the nuts is not continuous but rather, intermittent. The ball retainer trough (42) serves as a bridge which prevents the balls from falling when they cross the gap (46). Said ball retainer trough (42) is a channel whose cross section is a circular arc which subtends an angle $\psi=\phi-\alpha$ where $\alpha$ is the angular clearance, thus the linear clearance (38) is $r\alpha$ between the nuts (34) and the ball retainer (42), FIG. 8. The ball retainer may, or may not be integral with its pedestal (47). FIG. 11a shows a ball retainer trough to be used in conjunction with the nuts of FIGS. 12a and 12b, while FIG. 11b shows a ball retainer trough to be used in conjunction with the nuts of FIG. 12c.

Figure 26:
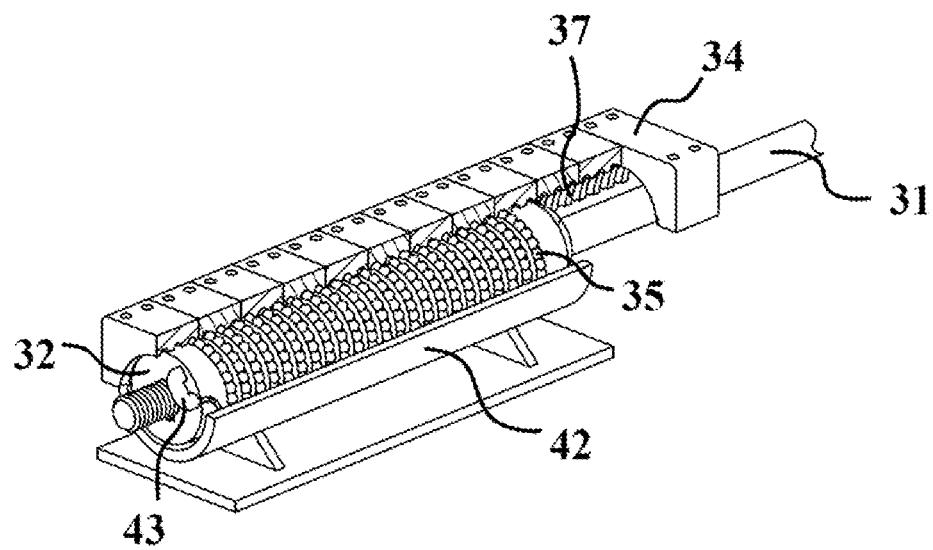
FIG. 26 shows a ball screw drive with a section removed to expose the screw, the balls and the ball retainer.
Figure 27:
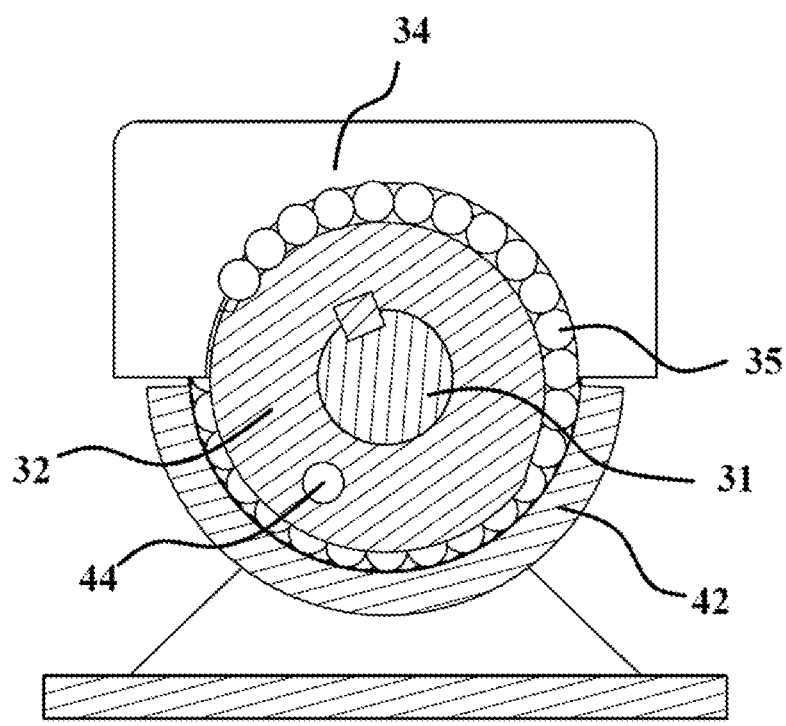
FIG. 27 shows a cross section of the ball screw and the ball retainer to show the manner in which the ball retainer partially envelops the screw with the balls.

FIG. 26 shows a ball screw drive with a number of nuts cut away to expose the screw (32), the balls (35) and the ball retainer (42). FIG. 27 shows a cross section of the screw (32) and the ball retainer (42) which shows the manner in which the ball retainer (42) partially envelops both the screw (32) and the balls (35).

Referring to FIGS. 10a, 10b and 10c: when the balls (35) reach the end of thread (36) at one end of the ball screw (32) they are submerged in the curved exit conduit (33) which leads them to the curved tube (43), which forces them to make a 180° turn and leads them to the straight return conduit (44) located inside the ball screw itself (32) and parallel to its own longitudinal axis; the straight return conduit (44) goes from one end to the other end of the ball screw (32) and links with an arrangement made up of a curved tube (45) and a curved entrance conduit which conveys the balls (35) to the entrance of the thread (36) of the ball screw (32) so that they will again circulate in between threads (36) of the screw (32), FIGS. 10b and (37) of nuts (34), FIG. 12a. The entrance and exit arrangements of the helical thread (36) are identical. The elements (43) to (45) make up the return conduit of the balls, FIG. 10a. This return conduit together with the helicoid conduit formed by the threads of the nuts and the threads of the ball screw, plus the helical path of the balls between the ball screw and the ball retainer channel make up the closed circuit of circulation of the balls.

It is pertinent to point out that the cylindrical surface of the ball screw (32) covered by the balls which transmit the load is $s=\theta rL$, where r is the radius of the ball screw and L is the length of the ball screw.

Figure 1:
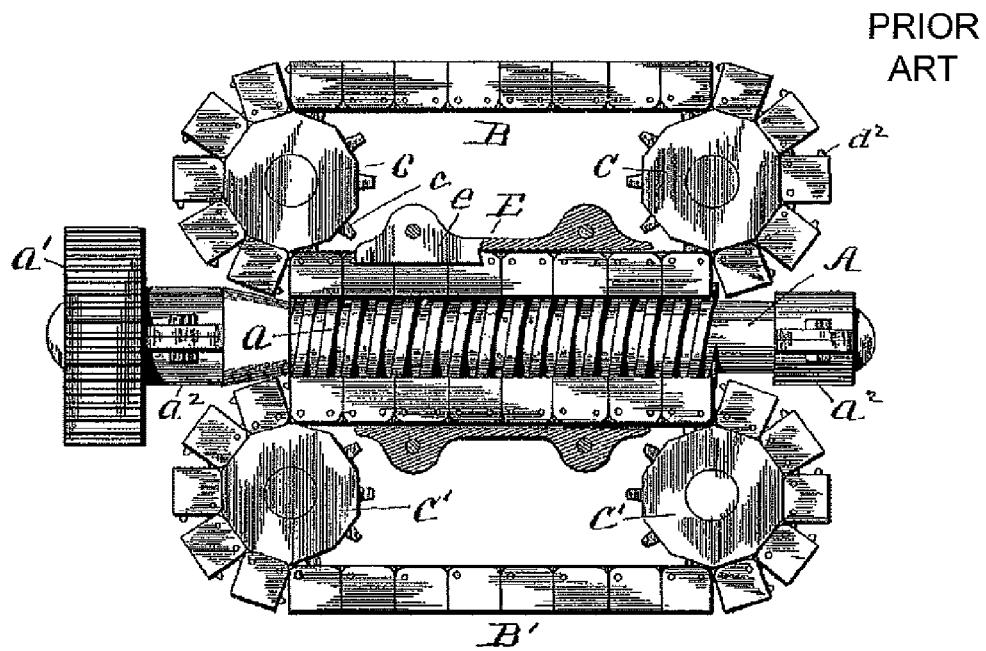
FIGS. 1, 2, 3, 4, 5, 6, 7a and 7b refer to prior art concepts.
Figure 2:
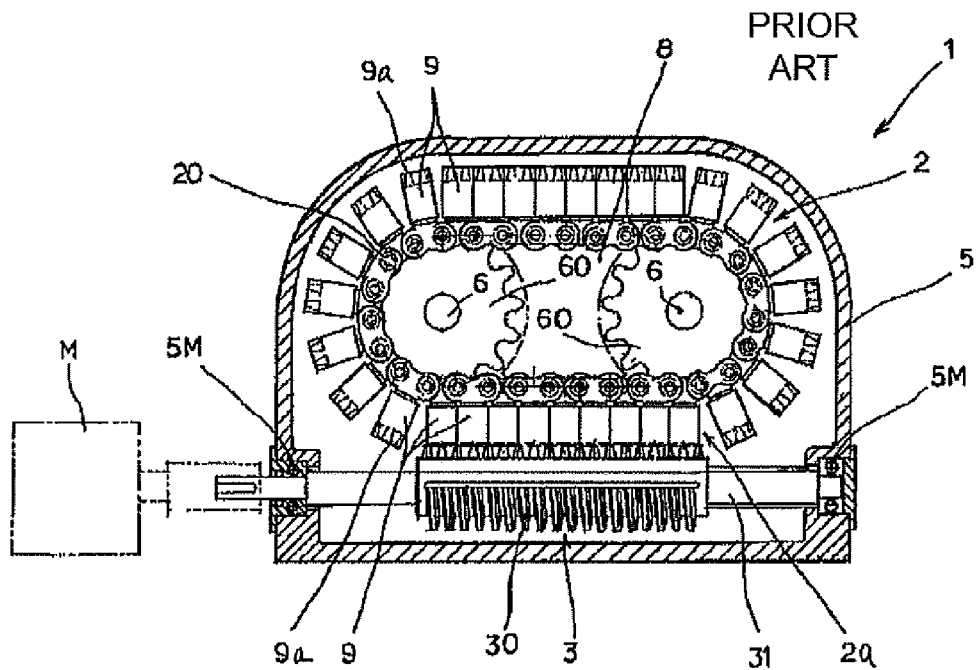
Figure 3:
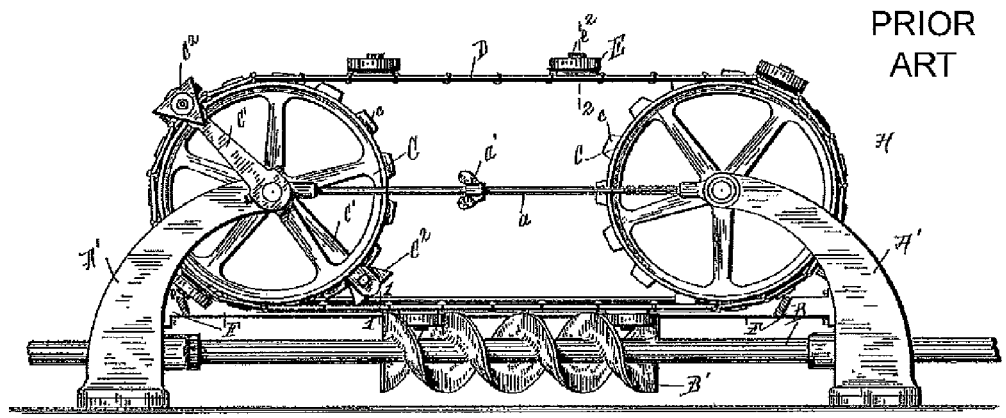
Figure 4:
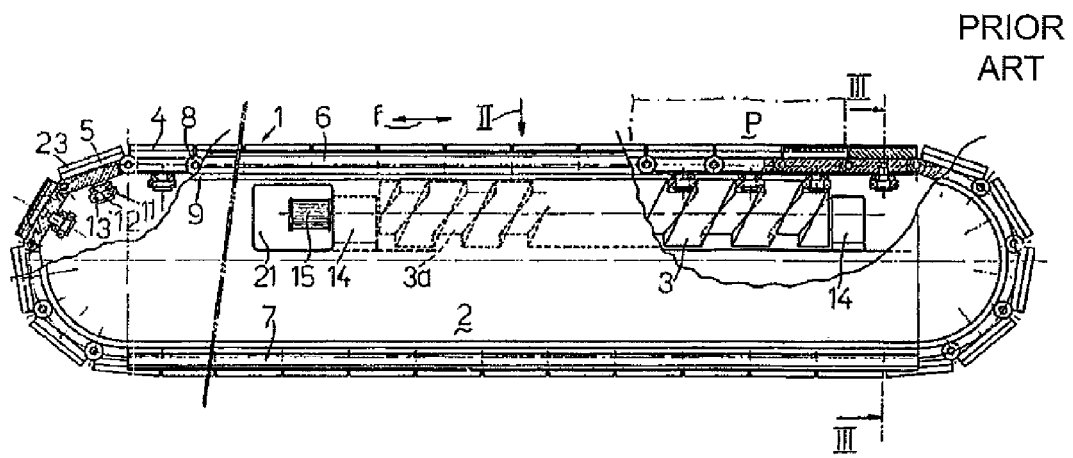
Figure 5:
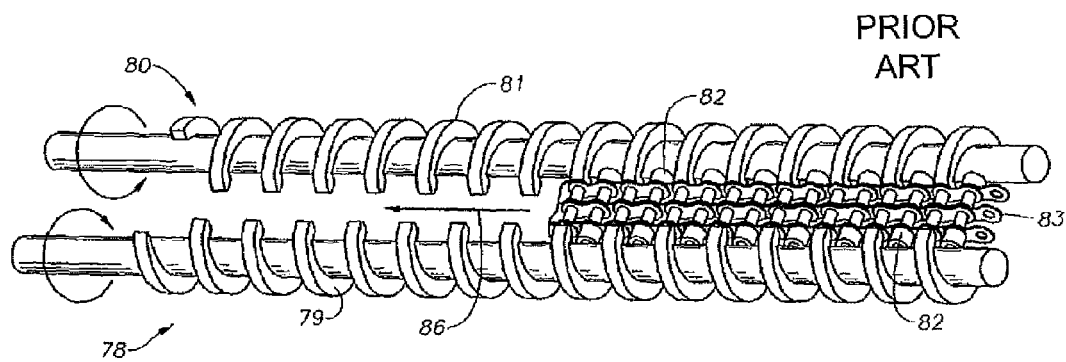
Figure 6:
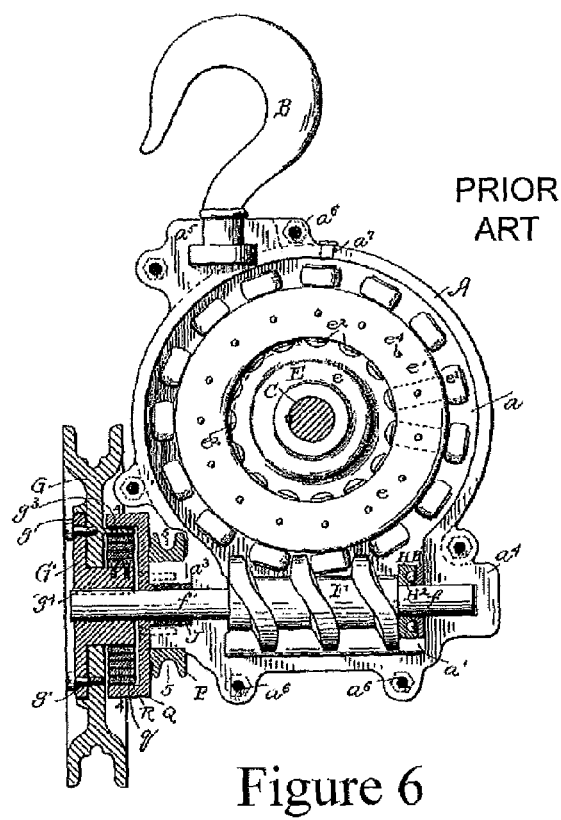
Figure 7A:
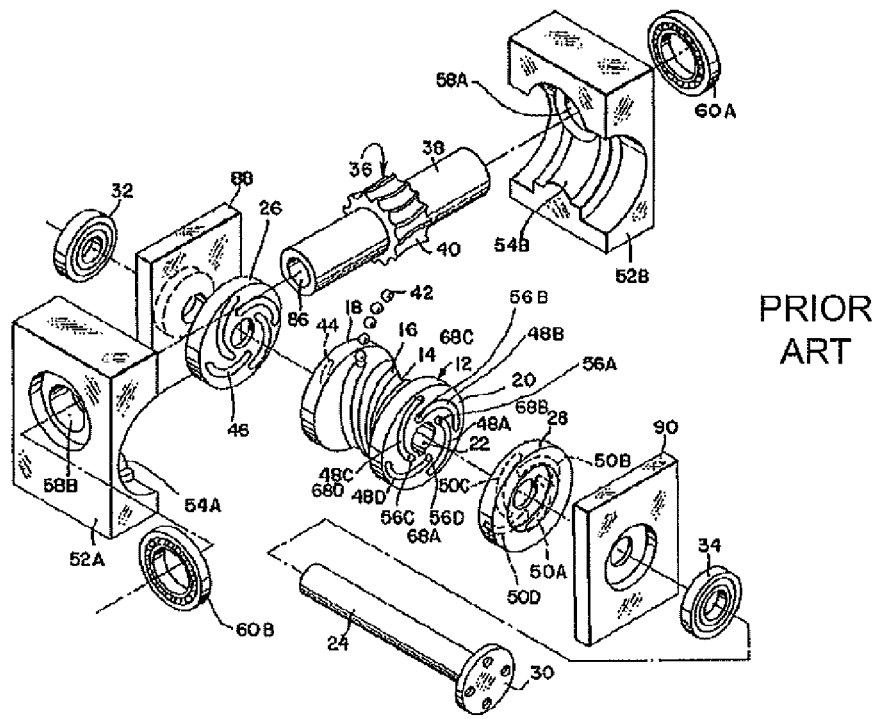
Figure 7B:
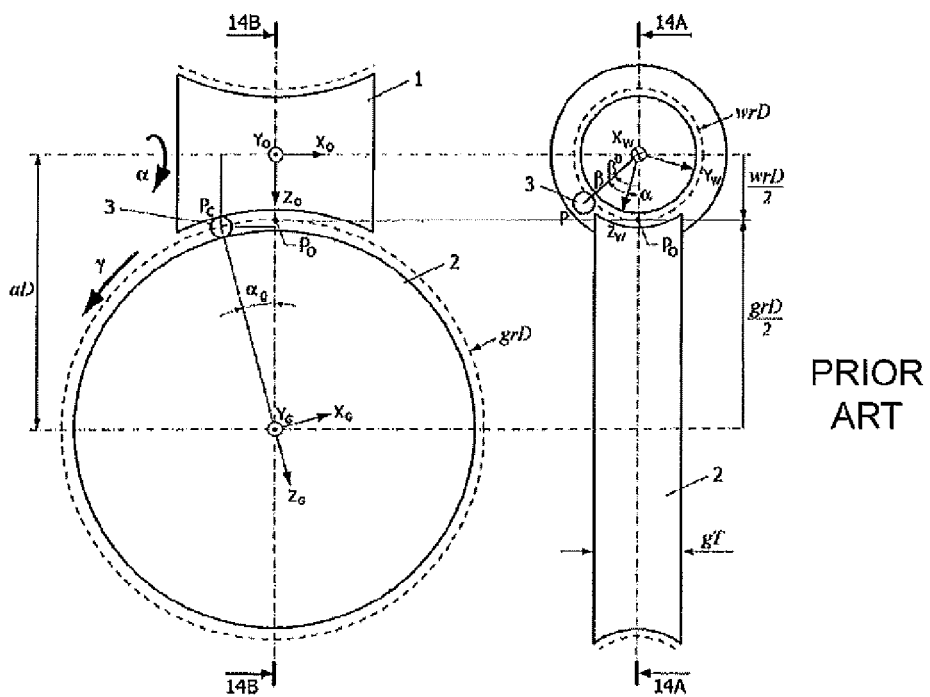
Figure 8:
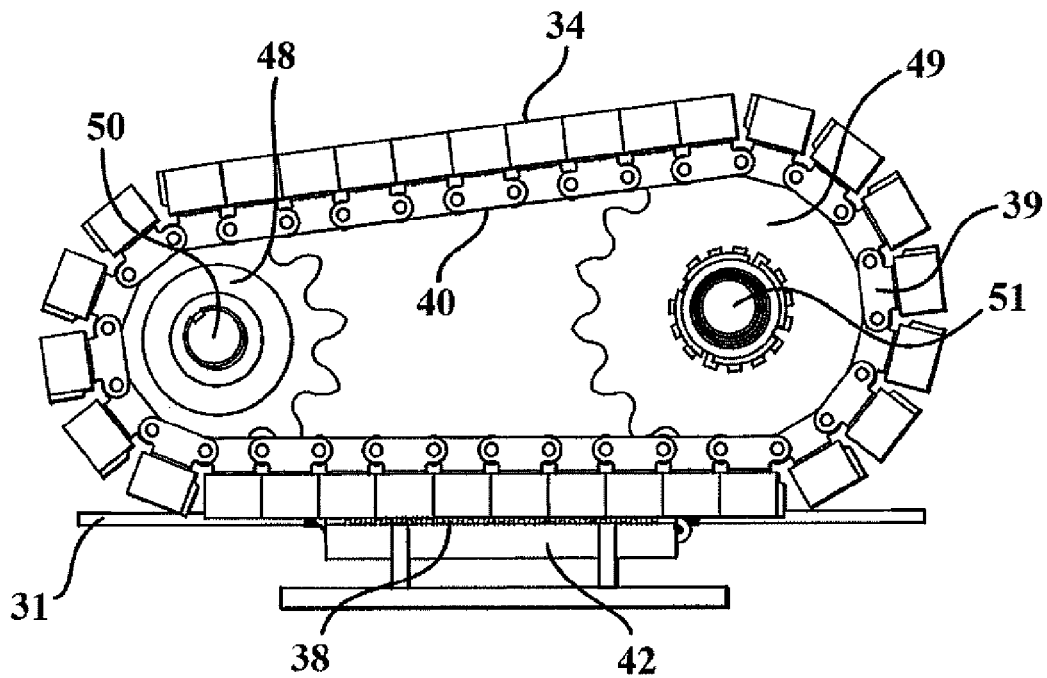
FIG. 8 is a conventional perspective view of the general concept of the first embodiment of the invention, including the main assemblies of the reducer/amplifier.
Figure 9:
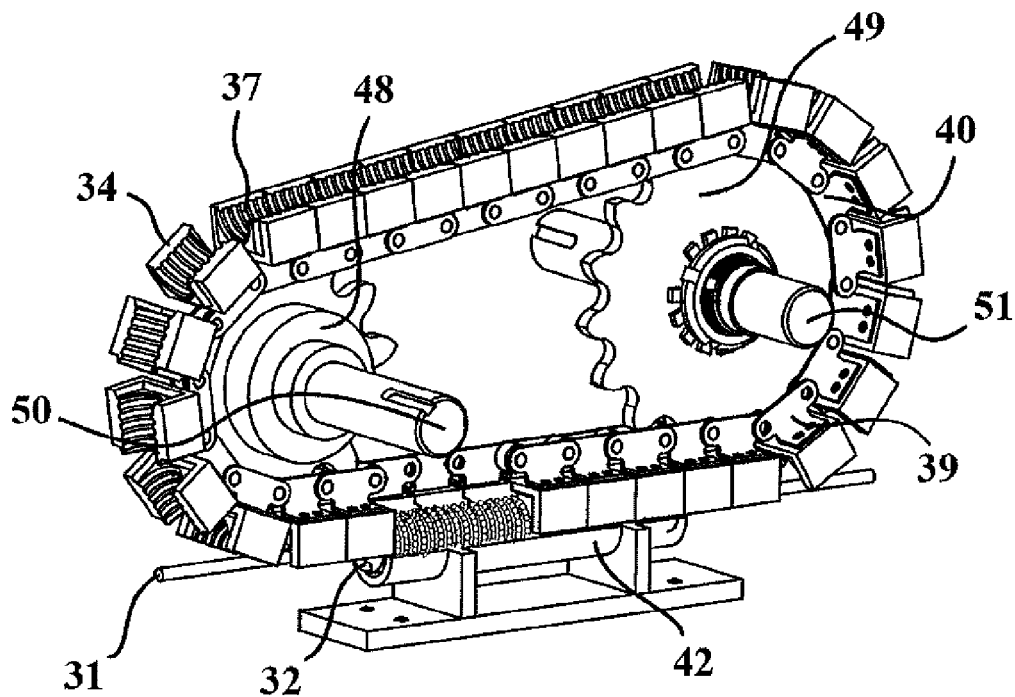
FIG. 9 is a conventional perspective view of the assembly in FIG. 8, with some nuts cut away to show the ball screw and its relationship with the ball retainer trough.
Figure 23:
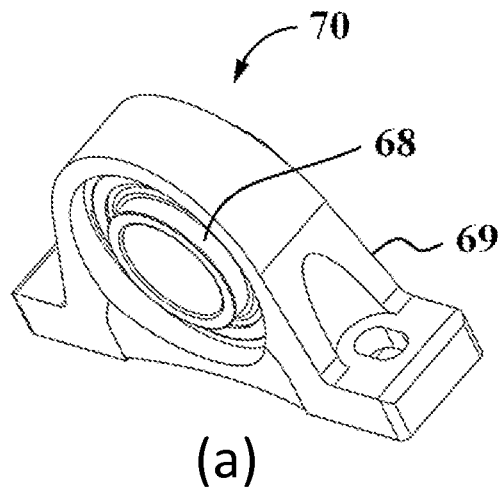
FIG. 23a shows a plummer block.
FIG. 23b shows a plummer block with a section removed to show the bearing.
Figure 23:
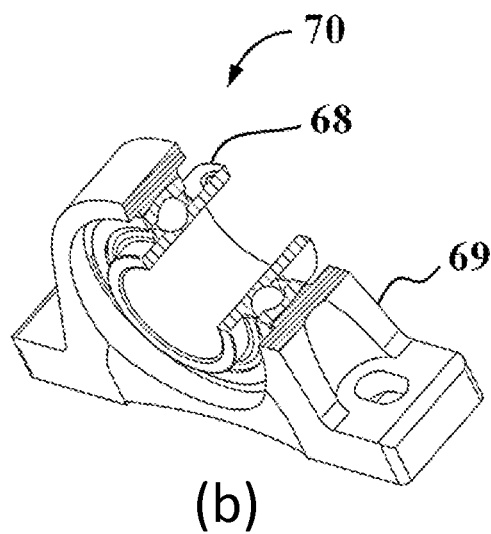
Figure 24:
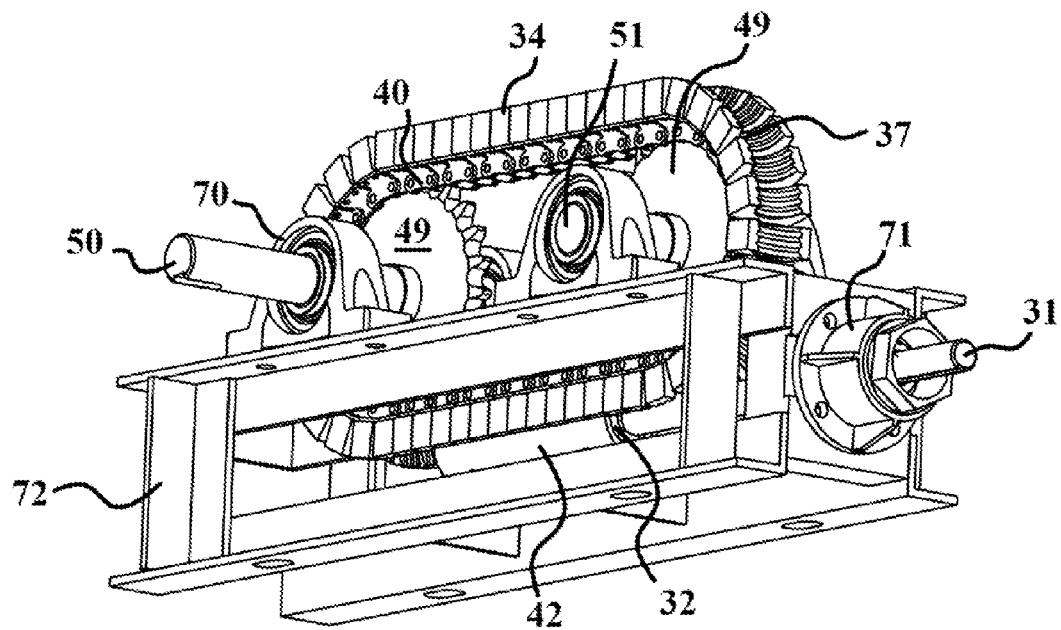
FIG. 24 shows the reducer frame.

Referring to FIGS. 8 and 9: the nuts (34) are fastened to the chain (40) so, that when the nuts (34) are displaced linearly, the chain (40) is also displaced linearly. The linear displacement of the chain produces an angular displacement of the sprockets (48) and (49). Said sprockets rotate together with their respective shafts (50) and (51) because the shafts are fastened unto the sprockets by means of keys or splines, or by another means, or may even be integral with the same. Shafts (50) and (51) of the sprockets (48) and (49) are supported on plummer blocks (70), FIG. 24. FIG. 23a is an external view of the plummer block (70), FIG. 23b shows the plummer block (70) with a section removed to show the bearing (68). The plummer blocks (70) are anchored, unto frame (72), FIG. 24.

Figure 22:
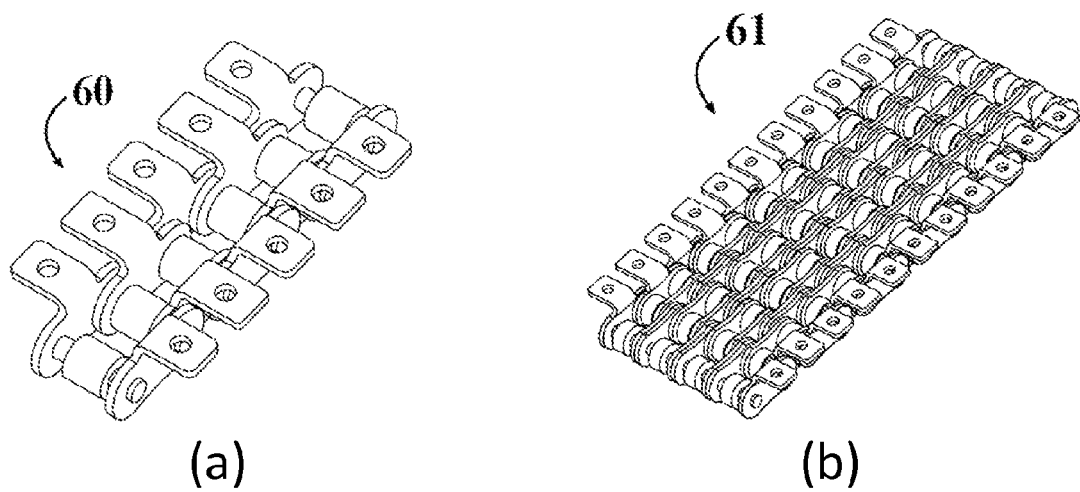
FIG. 22a shows a single strand roller chain with attachments.
FIG. 22b shows a four strand roller chain with attachments.

The chain and sprockets are of the roller type, the chain may be single, or multiple strand, according to requirements. FIG. 22a shows a single strand chain (60) with attachments, FIG. 22b shows a four strand chain (61) with attachments. The chain and sprockets may be either roller type or inverted tooth type, also known as silent chain.

In order to axially align the nuts (34), and also in order to prevent the possibility of a small rotation which could occur between the adjacent nuts, the nuts (34) have a protruding portion (52) on one of its sides, and a recessed portion (53) on the other side, FIG. 12b. The protruding portions (52) and the recessed portions (53) may have a pyramidal shape. It should be emphasized that the recessed portion (53) of a nut is coupled with the protruding portion (52) of its adjacent nut, in the straight stretches of the chain.

It may be convenient that sprockets (48) and (49) have different diameters so as to have two different output speeds, one from each shaft (50) and (51) respectively. Of course, the sprockets may have identical diameters, because there may be some applications which require this to be so.

When this first embodiment is used as a reducer, the shaft (31) is the input, high speed, shaft and the shafts (50) and (51) are the output, low speed, shafts. When this embodiment is used as an amplifier, one of the shafts (50) or (51) is the input, low speed, shaft, and the shaft (31) is the output, high speed, shaft.

Both the ball screw (32) and the nuts (34) may have a single thread, or they may have a rapid advance thread, that is, one with multiple threads.

The chain (40) may be a roller chain or an inverted tooth chain (also known as silent chain), or even, a toothed belt could conceivably substitute the chain. In the case that the chain (40) and the corresponding output sprockets (48) and (49), are of the roller type, the chain may be single strand chain (60), FIG. 22a, or multiple strand, i.e., double, triple etc. depending on the load capacity. FIG. 22b shows a four strand chain (61).

In other variants, the chain (40) may drive 2, 3, or more output sprockets with their respective shafts, in order to have various reduction ratios, or, in order to drive various different loads.

Since there is rolling contact between the screw (32), the balls (35) and the nuts (34) the friction is much lower than that of the worm and gear reducer, where there is a predominantly sliding contact. Additionally, the contact surfaces may be as great as desired, and in any case, much greater than in the case of the worm and gear.

For these reasons, the reducer/amplifier being referred to in this first embodiment of the present invention has both a load capacity and an efficiency which are greater than those of a worm and gear reducer, and greater than in all of the devices referred to in the patents mentioned previously.

A greater reduction may be obtained by using a differential ball screw.

Second Embodiment

Similar to the first embodiment and referring to FIGS. 14, 15, 16 and 17, a motor (not shown), coupled to the shaft (2) of the roller screw (1), makes both rotate about their common geometrical axis. The input shaft (2) is supported on one end by a bearing in a flanged housing, and on the other end by the chain (8). The rotation of the roller screw (1) is converted into a straight line displacement of the nuts (3), by means of the plurality of threaded planetary rollers (4) of the roller screw (1), which roll between the central sun screw (5) of the roller screw (1) and the nuts (3).

A nut (3) is fastened to each link (7) of the chain (8), by fastening means known in the art such as could be screws or rivets (not shown) or, said nuts (3) may be integral with the links (7).

Figures 18A, 18B:
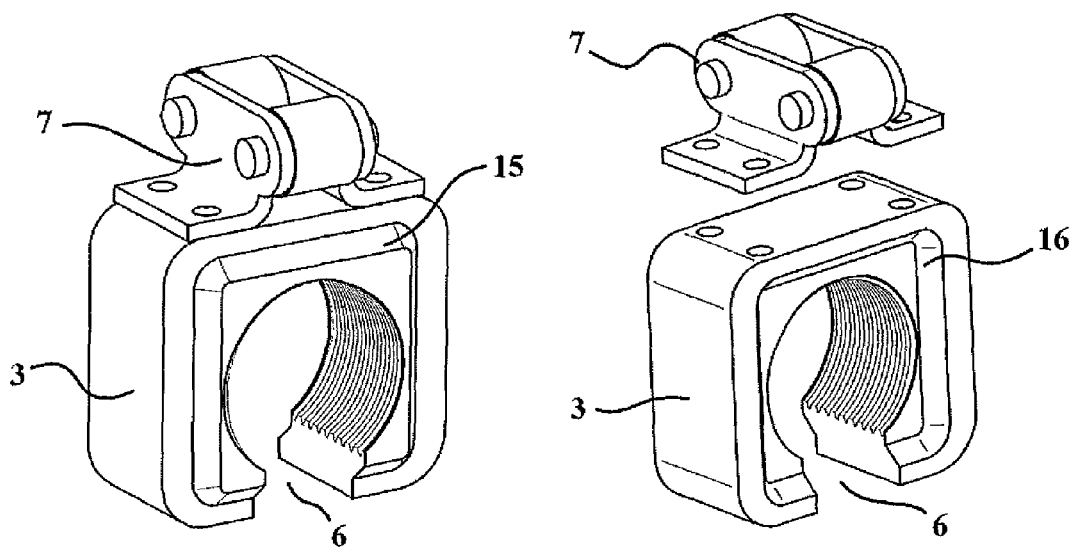
FIG. 18a is a conventional perspective view, from a first side, which shows a nut mounted in position on a chain link.
FIG. 18b is FIG. 18a exploded, seen from a second side.

The nuts (3) have a λ wide gap (6), FIGS. 18a and 18b, to avoid interference with the shaft (2) of the screw (5), just as in the case of the first embodiment.

Similarly to the first embodiment, and in order to align the nuts (3) axially, and so as to prevent the possibility of a small rotation which could occur between the adjacent nuts, the nuts (3) have a protruding portion (15) on one of its ends, and a recessed portion (16) on the other end, both centered on the longitudinal axis of the threaded cylindrical surface, FIGS. 18a and 18b. The protruding portion (15) and the recessed portion (16) may have a pyramidal shape. The recessed portion (16) of a nut is coupled with the protruding portion (15) of its adjacent nut in the straight stretches of the chain (8).

Figure 14:
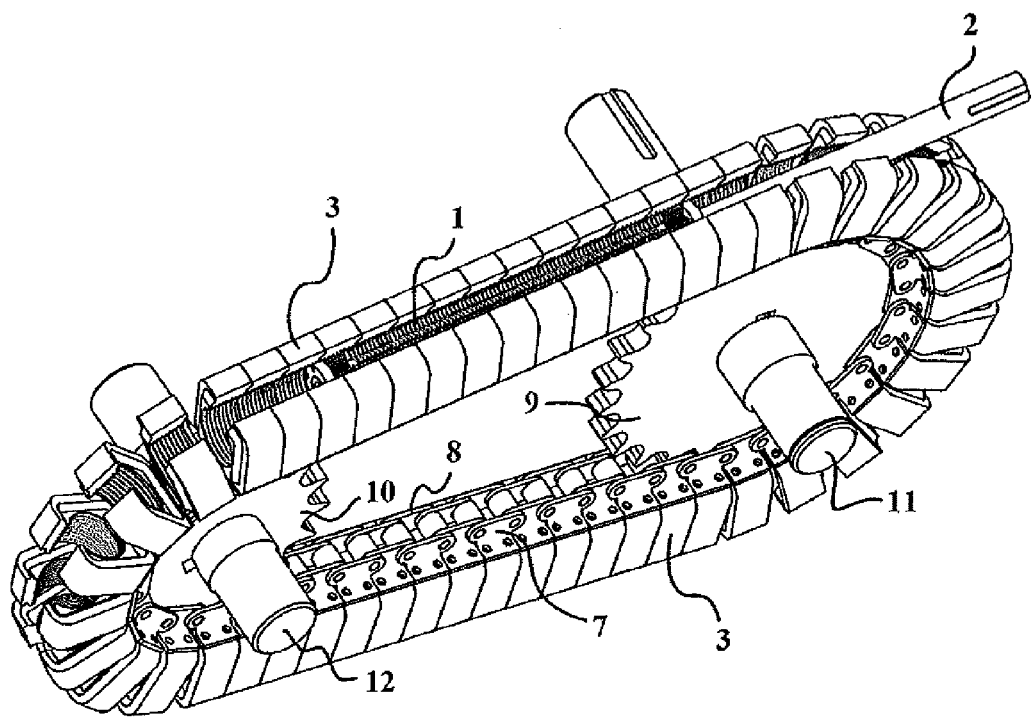
FIG. 14 is a conventional perspective view of the general concept of the second embodiment of the reducer/amplifier, which includes the main assemblies.
Figure 15:
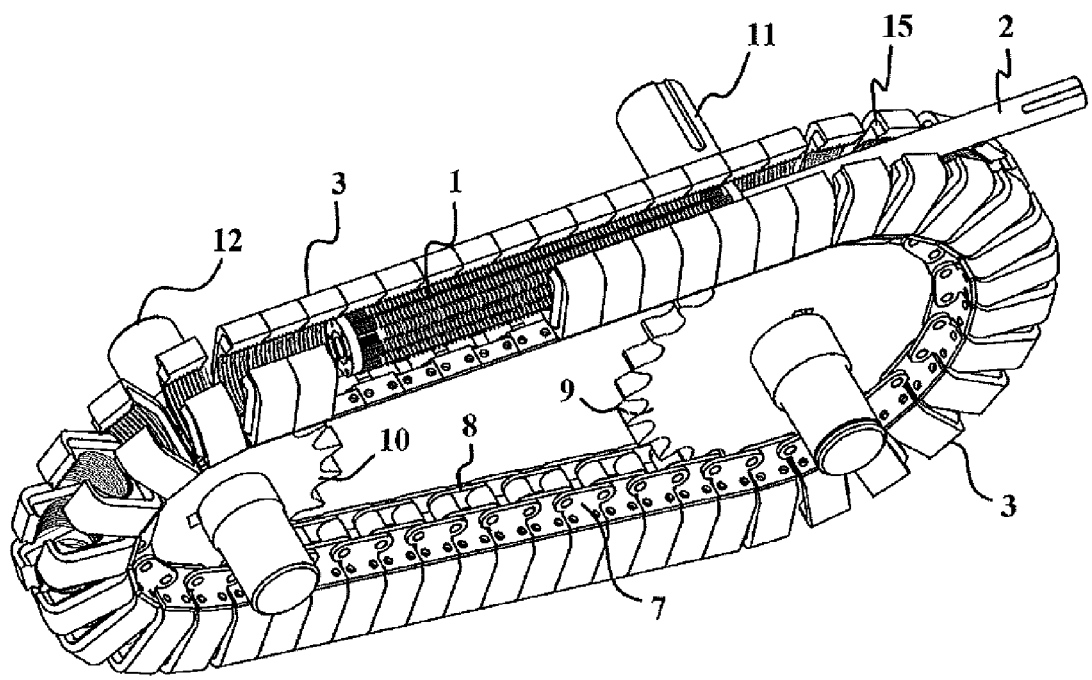
FIG. 15 is a conventional perspective view of the assembly of FIG. 14, with a few nuts cut away to partially expose the roller screw.
Figure 16:
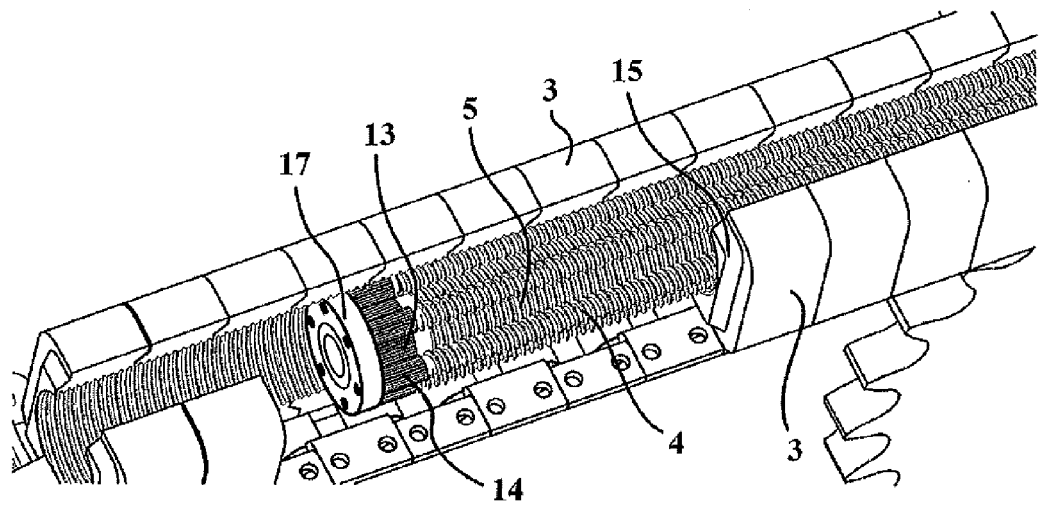
FIG. 16 is an amplified view of the cut away portion of FIG. 15.
Figure 17:
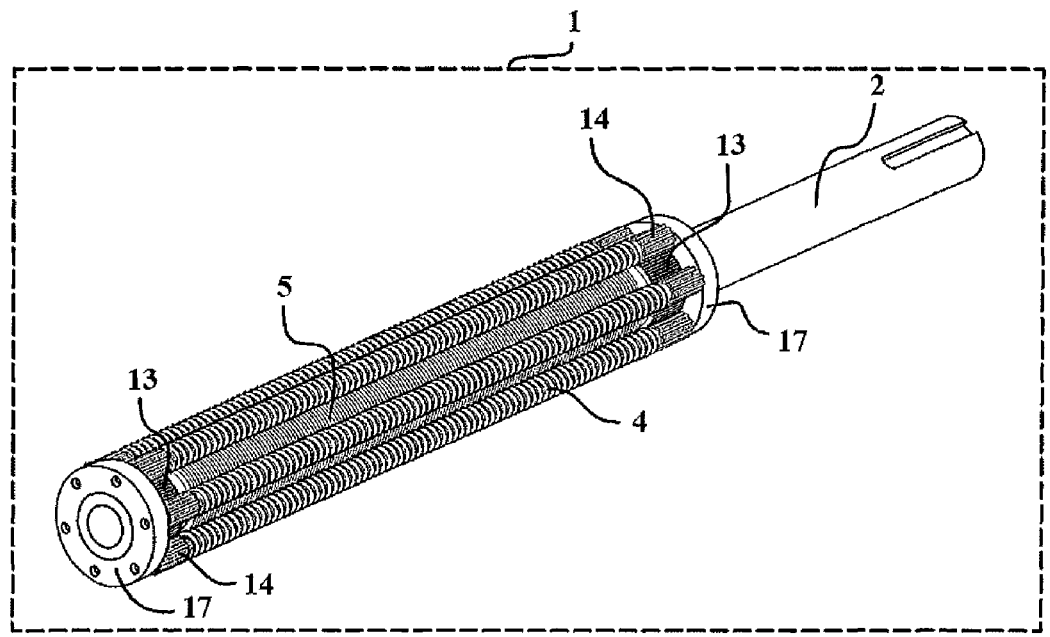
FIG. 17 Referring to the second embodiment, shows the assembly of the roller screw and its shaft.

In this second embodiment, shown in FIGS. 14 and 15, the configuration of chain (8) in operation is made up of two circular arcs and two straight stretches. The roller screw (1) drives the nuts (3) in one of the straight stretches of the chain.

In view that the nuts (3) are fastened unto the chain (8), upon the displacement of the nuts (3), the chain (8) is also displaced. This produces an angular displacement of the output sprockets (9) and (10). The output sprockets (9) and (10) turn together with their respective shafts (11) and (12) because they are either keyed or splined together, or they may be integral with each other. The sprocket shafts (11) and (12) are output, low speed, shafts, and are supported on bearings (not shown). Generally, it is convenient that the output sprockets have different diameters so as to have two different reduction ratios, one from each output shaft (11) and (12). The output sprockets may have identical diameters, because there may be some applications which require this to be so.

When this second embodiment of the invention is used as a reducer, the shaft (2) is the input, high speed, shaft and the shafts (11) and (12) are output, low speed, shafts. When this embodiment of the invention is used as an amplifier, one of the shafts (11) or (12) (or both) is the input, low speed, shaft, and shaft (2) is the output, high speed, shaft.

Figure 21:
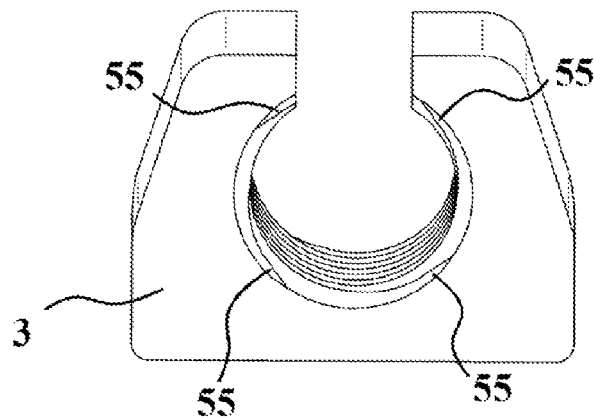
FIG. 21 shows a nut with four thread starts.

It is possible that both the roller screw (1) and the nuts (3) have a single thread or a rapid advance thread, that is, one with multiple thread starts. FIG. 21 shows a nut with four thread starts (55).

The chain (8) can be either a roller chain, or a silent chain or any other suitable chain or it could conceivably be a toothed belt or some other kind of belt. The roller chain (8) and the sprockets (9) and (10) may be single strand or multiple strand: double, triple, etc. according to the different requirements, FIG. 22.

Figure 19:
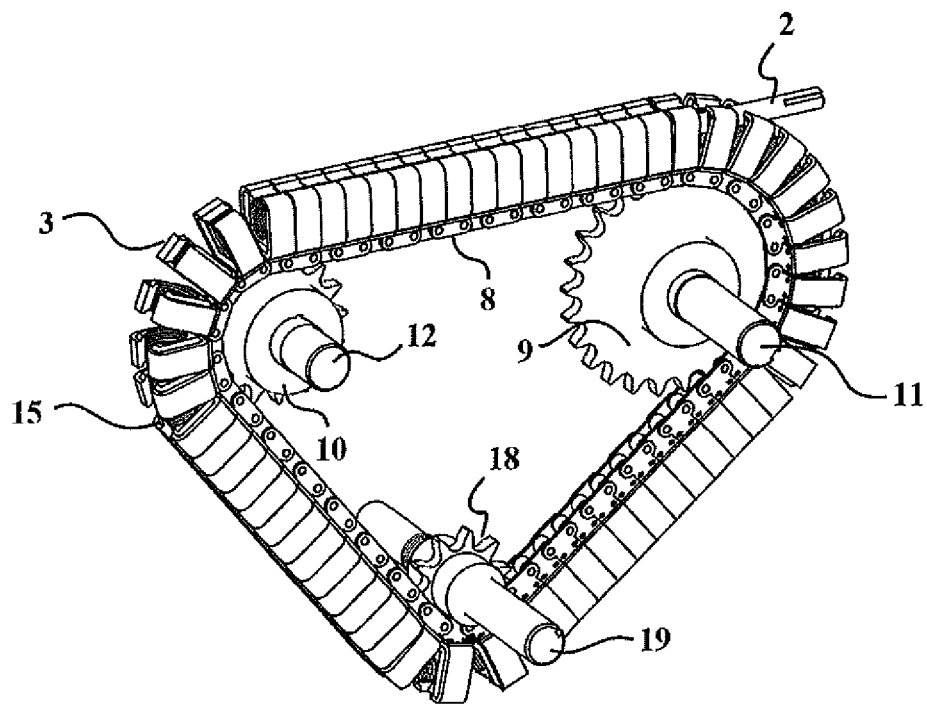
FIG. 19 shows a variant of the general assembly of FIG. 14, wherein the chain drives three different diameter output sprockets with their respective shafts.
Figure 20:
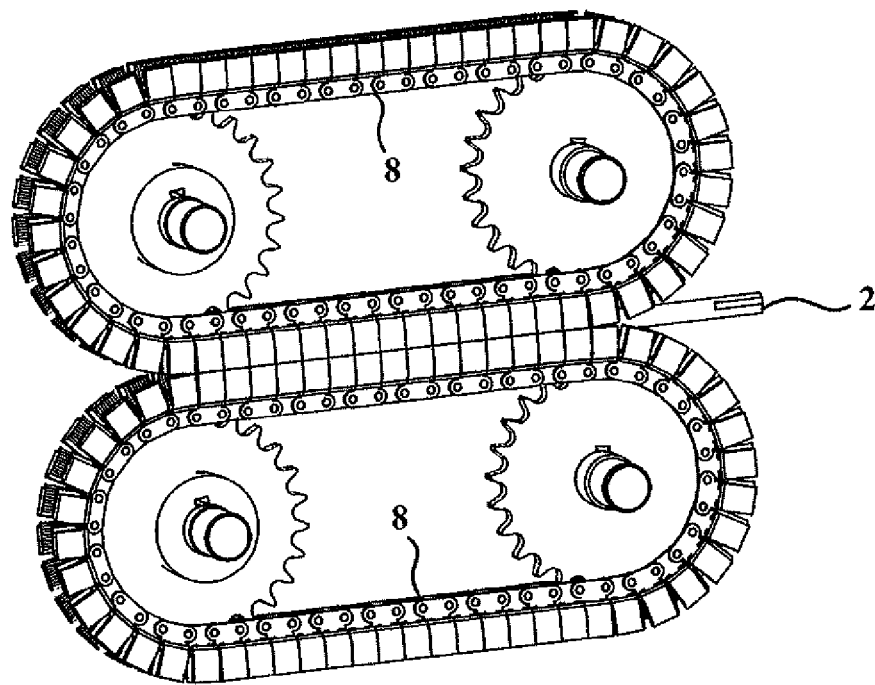
FIG. 20 shows another variant of the general assembly of FIG. 14 wherein the roller screw drives two chain transmissions.

In other variations, the chain (8) may drive 2, 3, or more output sprockets with their respective shafts, in order to have various reduction ratios. For example, the variant in FIG. 19 shows a transmission with three output sprockets (9), (10) and (18) with their respective shafts (11), (12) and (19).

As has already been pointed out, in this second embodiment of the invention, the roller screw (1) acts as a drive screw and its threaded planetary rollers (4) roll between the central sun screw (5) and the nuts (3) and drive said nuts in a straight line. At the ends of the central sun screw (5), there are gears (13), which are integral to the central sun screw (5) itself, FIG. 17. On the ends of the threaded planetary rollers (4) there are pinions (14), which are integral with said threaded planetary rollers (4). The pinions (14) mesh with the gears (13). In this way, the turning of the central sun screw (5) causes the threaded planetary rollers (4) to turn on their own geometric axes and orbit around central sun screw (5) by means of the pinions (14). The threaded planetary rollers (4) are mounted on the rings (17); these rings keep the threaded planetary rollers (4) separated from each other. The gears (13) and the pinions (14) serve the purpose of synchronizing the orbital movement of the threaded planetary rollers (4).

Since there is rolling contact between the central sun screw (5) and the threaded planetary rollers (4) and also between said planetary rollers and the nuts (3), friction is lower and thus efficiency is greater than that of a worm gear reducer. Because of the high efficiency of this embodiment it may be used in reverse form as an amplifier. As pointed out in connection with the first embodiment, reversibility depends both on the lead angle of the thread and on the friction between the drive screw and the driven nuts. The greater the lead angle the more reversible is the reducer. Also, the less friction between the drive screw and the nut, the more reversible is the reducer. As a matter of fact: "A screw will be self-locking if the coefficient of friction is equal to or greater than the tangent of the lead angle." Quoted from FUNDAMENTALS OF MECHANICAL DESIGN, R. M. Phelan, $3^{rd}$ Ed., 1975, Tata McGraw-Hill, page 229. In other words, there is reversibility when: $\mu < \tan \alpha$, $\alpha$=lead angle, $\mu$=coefficient of friction.

Additionally, the contact surface of a threaded planetary roller (4) is much greater than the contact surface of a row of balls (with a length comparable to that of a planetary roller), and as a consequence the load capacity of this second embodiment is greater by one order of magnitude than that of the first embodiment. As was already pointed out, the load capacity of the first embodiment is much greater than that of the worm and gear. Additionally, the life of the roller screw is much greater than that of the ball screw of the first embodiment.

The effectiveness of the roller screw, insofar as the increase in both the load capacity and the efficiency, has been amply proven in its application on commercial actuators by different manufacturers.

A greater reduction can be achieved by using a differential roller screw.

Insofar as this invention has been described in terms of its two embodiments and several variations, there are alterations, permutations and equivalents which lie within the scope of this invention. It should also be emphasized that there may be many alternative ways to implement the devices and methods of the present invention. Therefore, it is assumed that the following claims shall be interpreted so as to include all such alterations, permutations are equivalent as long as they lie within the spirit and scope of the present invention.

What is claimed is:

1. A speed reducer comprising:
   an endless chain transmission with a plurality of links, with a nut fixed to each one of the links, each of the nuts including a thread formed thereon;
   two output sprockets driven by the endless chain, each of the output sprockets mounted on a distinct sprocket shaft; and
   a drive screw made up of a central sun screw integral with a drive screw shaft and a plurality of rolling bodies which roll and orbit around the central sun screw, the central sun screw including a thread formed thereon;
   wherein the rolling bodies roll between the thread of the central sun screw and the threads of the nuts, and wherein the rolling bodies satisfy a condition for reversibility of the speed reducer, the condition for reversibility requiring $\tan \alpha > \mu$, where $\mu$ is a coefficient of friction between a contact surface of each of the rolling bodies and the central sun screw and the thread of each of the nuts, and $\alpha$ is a lead angle of the drive screw;
   wherein the rotation of the central sun screw causes the plurality of rolling bodies to roll to cause a linear displacement of the nuts, the linear displacement of the nuts driving a linear displacement of the chain, the linear displacement of the chain converted into a rotation of the two output sprockets; wherein a first end of the drive screw shaft rests on a bearing and a second end thereof rests on at least one of the nuts along a straight stretch of the chain; wherein each of the sprocket shafts rest on a bearing at each end thereof and each of the sprocket shafts and the drive screw shaft are anchored on a frame; and wherein the drive screw shaft normally acts as a high speed input shaft and each of the sprocket shafts normally act as low speed output shafts.

2. The speed reducer, in accordance with claim 1, wherein the nuts have a gap to avoid interference of each of the nuts with the drive screw shaft.

3. The speed reducer, according to claim 1, wherein the chain is a multiple strand roller chain, and the sprockets are, correspondingly, multiple roller chain sprockets.

4. The speed reducer, according to claim 1, wherein the chain is an inverted tooth chain, also known as silent chain, and correspondingly the sprockets are silent chain sprockets.

5. The speed reducer, according to claim 1, wherein the drive screw and the nuts have a single thread.

6. The speed reducer, according to claim 1, wherein the drive screw and the nuts have a multiple thread.

7. The speed reducer, according to claim 1, wherein the sprockets have different diameters.

8. The speed reducer, according to claim 1, wherein the sprockets have equal diameters.

9. The speed reducer, in accordance with claim 1, wherein at least one of the sprocket shafts acts as a low speed input shaft and the drive drive screw shaft acts as a high speed output shaft when the speed reducer is operated in reverse as a speed amplifier.

10. The speed reducer, according to claim 1, wherein the drive screw drives two chain transmissions simultaneously.

11. The speed reducer, in accordance with claim 1, wherein the nuts have a protruding portion on one side and a recessed portion on the other side, in which the protruding portion on each nut is coupled with the recessed portion on the adjacent nut when the nuts are arranged along a straight portion of the chain.

12. The reducer, in accordance with claim 1, wherein the drive screw is a roller screw.

13. The speed reducer, according to claim 1, wherein the roller screw includes a gear on each end integral with the central sun screw and a plurality of planetary threaded rollers each having a pinion on each end integral with each of the planetary threaded rollers, wherein the gears of the central sun screw and the pinions of the planetary threaded rollers are meshed.

14. The speed reducer, in accordance with claim 1, wherein the drive screw is a ball screw including a rod with a helical thread and a plurality of balls; the balls circulate in a circuit made up of a first section and a second section, the first section including a first portion including a conduit formed by the threads of both the ball screw and the nuts and a second portion formed by a cooperation of the thread of the ball screw and an unthreaded concave cylindrical surface of a ball retainer trough; wherein the second section is a return section formed by a straight conduit in the ball screw parallel to a geometrical axis thereof, the second section extending from a first end of the ball screw to a second end thereof, and wherein a 180° turn tube is formed at each of the first end and the second end of the ball screw to connect the first section to the second section.

15. The speed reducer, in accordance with claim 14, wherein the helical threads in both the ball screw and the nuts are grooves with a cross section that is an arc of a circle; both threads cooperate to form a helical conduit for the rolling of the balls.

16. The speed reducer, in accordance with claim 14, wherein the ball retainer trough includes a geometric axis coincident with the geometric axis of the ball screw.

17. The speed reducer, in accordance with claim 14, wherein the helical threads in both the ball screw and the nuts are grooves with a "v" shaped cross-section, both threads cooperating to form a helical conduit for the rolling of the balls.

* * * * *